(12) United States Patent
Lammers et al.

(10) Patent No.: US 6,480,368 B1
(45) Date of Patent: Nov. 12, 2002

(54) MONITORING CIRCUIT FOR MONITORING A VOLTAGE

(75) Inventors: Arend Jan Willem Lammers, Hengelo (NL); Gerrit Willem Hendriks, Nijverdal (NL)

(73) Assignee: Holec Holland N.V., Hengelo (NL)

( * ) Notice: Subject to any disclaimer, the term of this patent is extended or adjusted under 35 U.S.C. 154(b) by 0 days.

(21) Appl. No.: 09/807,021

(22) PCT Filed: Oct. 8, 1999

(86) PCT No.: PCT/NL99/00625

§ 371 (c)(1),
(2), (4) Date: May 10, 2001

(87) PCT Pub. No.: WO00/22713

PCT Pub. Date: Apr. 20, 2000

(30) Foreign Application Priority Data

Oct. 9, 1998 (NL) .............................................. 1010285

(51) Int. Cl.$^7$ .............................................. H01H 51/30
(52) U.S. Cl. ...................................................... 361/160
(58) Field of Search ................................ 361/160, 189, 361/190, 206, 187; 307/112, 115

(56) References Cited

U.S. PATENT DOCUMENTS

| | | | |
|---|---|---|---|
| 4,025,823 A | | 5/1977 | Lang et al. |
| 5,142,435 A | * | 8/1992 | Baumgartner et al. ...... 361/160 |

FOREIGN PATENT DOCUMENTS

| DE | 1 438 960 | 11/1968 |
|---|---|---|

* cited by examiner

*Primary Examiner*—Shawn Riley
(74) *Attorney, Agent, or Firm*—Young & Thompson

(57) ABSTRACT

Monitoring circuit for monitoring a voltage, comprising a coil, which is incorporated in a first current branch to be connected to the voltage to be monitored, and an auxiliary relay, the actuating winding of which is incorporated in a second current branch connected in parallel to the first current branch. In the first current branch a first make contact of the auxiliary relay is connected in series with the coil. In the second current branch a first resistor is connected in series with the actuating winding of the auxiliary relay. A series circuit consisting of a second resister and a second make contact of the auxiliary relay is connected in parallel to the actuating winding of the auxiliary relay.

2 Claims, 1 Drawing Sheet

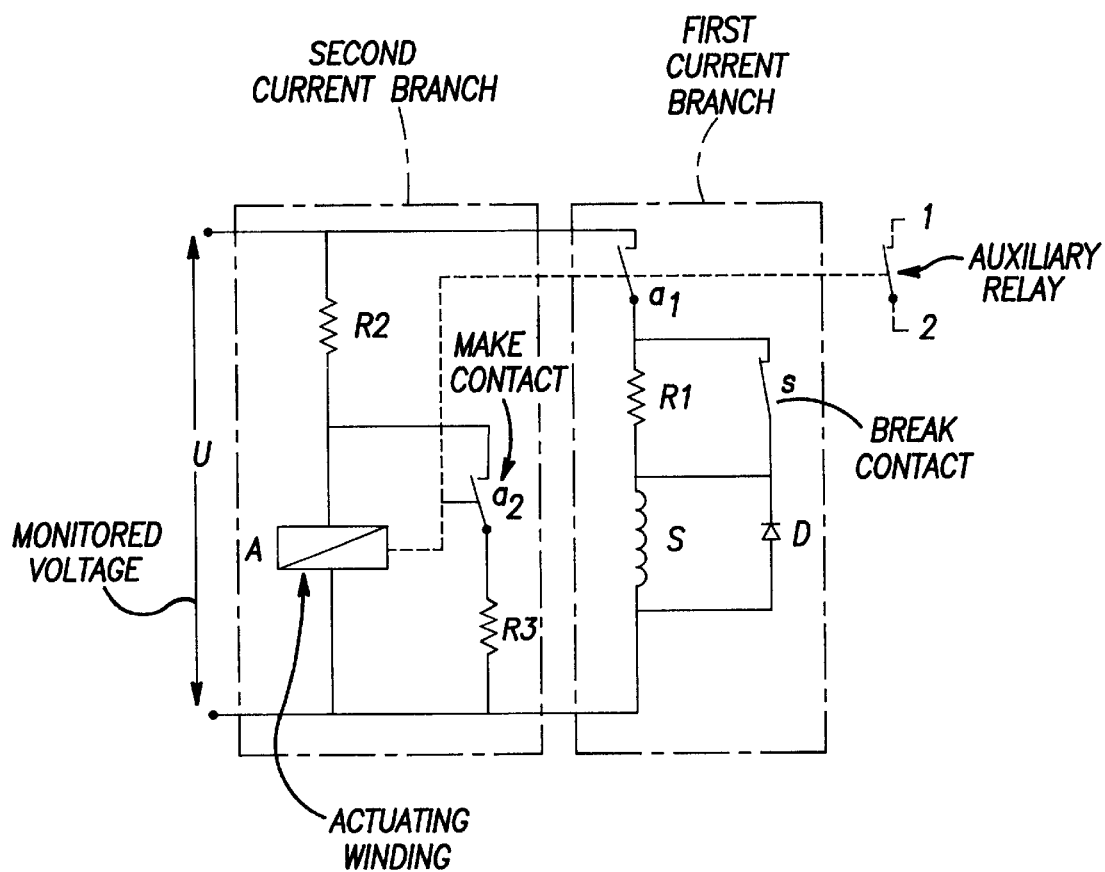

MONITORING CIRCUIT FOR MONITORING A VOLTAGE

FIELD OF INVENTION

The invention relates to a monitoring circuit for monitoring a voltage, comprising a coil, which is incorporated in a first current branch to be connected to the voltage to be monitored, and an auxiliary relay, the actuating winding of which is incorporated in a second current branch connected in parallel to the first current branch.

BACKGROUND OF INVENTION

The requirement imposed on this monitoring circuit is that the coil, which is also referred to as the zero voltage coil, must be in the de-energised state when the voltage to be monitored has a value which is less than or equal to a predetermined percentage of the nominal value thereof. When the voltage to be monitored increases again the zero voltage coil must be excited again as soon as the voltage to be monitored is at a value which is greater than or equal to a second predetermined percentage of the nominal value thereof A monitoring circuit of this type having a hysteresis in the switching function is disclosed in laid-open German Patent Application 1 438 960.

The known monitoring circuit is a relay circuit which consists of a first relay in series with a resistor. The DC voltage to be monitored is connected over said series circuit. The known relay circuit also comprises a second current branch parallel to the first current branch in which the first relay and the resistor are incorporated. An auxiliary relay, in series with a make contact, is incorporated in the second current branch. Said make contact is a contact of the first relay. The resistor connected in series with the first relay is bridged by a break contact of the auxiliary relay.

The known circuit is so sized that when the DC voltage to be monitored increases to 5.1 volt sufficient current flows through the actuating winding of the first relay and it is consequently excited. As a consequence of this the make contact that is connected in series with the auxiliary relay is closed, so that the actuating winding of the auxiliary relay is also brought into the excited state. The result of this is that the bridging break contact for the resistor connected in series with the first relay is opened. As a result of opening of said break contact the associated resistor in the actuating circuit of the first relay is switched in and the current in the actuating winding of the first relay is reduced.

SUMMARY OF INVENTION

The aim of the invention is to provide a monitoring circuit of the type mentioned in the preamble with which the switching hysteresis is reproducible. Moreover, the monitoring circuit must be easily adjustable and of small volume. Furthermore, the monitoring circuit must be robust.

To this end the invention is characterised in that in the first current branch a first make contact of the auxiliary relay is connected in series with the coil, in that in the second current branch a first resistor is connected in series with the actuating winding of the auxiliary relay and in that a series circuit of a second resistor and a second make contact of the auxiliary relay is connected in parallel to the actuating winding of the auxiliary relay.

The invention has the advantage that only one relay is needed in order to obtain any desired hysteresis. When the resistance ratings of the first and second resistor are low compared with those of the actuating winding of the auxiliary relay a more accurate monitoring circuit is obtained which is also not sensitive to changes in temperature.

BRIEF DESCRIPTION OF DRAWING

The invention will be explained in more detail below with reference to the drawing, in which one embodiment of a monitoring circuit according to the invention is shown.

DETAILED DESCRIPTION OF THE INVENTION

The monitoring circuit shown in the drawing serves to monitor the voltage U. To this end the voltage U to be monitored is connected over a first current branch in which a coil S (also termed the zero voltage coil) or electromechanical actuator, a resistor R1 and a make contact $a_1$ connected in series are incorporated. Said make contact a is a contact of an auxiliary relay, the actuating winding A of which, connected in series with a resistor R2, is incorporated in a second current branch which is connected in parallel to the first-mentioned current branch. The auxiliary relay is also provided with a second make contact $a_2$, by means of which the resistor R3 can be connected in parallel with the actuating winding A of the auxiliary relay. The resistor R1 connected in series with the zero voltage coil S is bridged by a break contact s that is operated by the coil S. A diode D is also connected over the coil S for protection.

The aspect concerned here is a zero voltage coil S, or electromechanical actuator, which must be in the excited state when the supply voltage is, for example, 70% or more of the nominal value and must be de-energised when the supply voltage is below, for example, 35% of the nominal value.

The invention consists of two parts. One part consists of the zero voltage coil S and the series resistor R1. When switched out and during switching in, said resistor R1 is bridged by the auxiliary contact s, as a result of which the maximum current is able to flow through the winding of the coil S. When the coil has been activated with the voltage U at an adequate magnitude and with make contact al closed and it is in the excited state, the break contact s is opened and bridging of the resistor R1 is interrupted. The current through the coil S will then be reduced. It has been found that said first part functions insufficiently accurately, in other words the coil S does not become excited or de-energised at the correct voltage levels and the excitation and de-energising points are not reproducible.

The other part of the circuit according to the invention is formed by the auxiliary circuit which consists of an auxiliary relay with the actuating winding A, a series resistor R2 and a bridging resistor R3 which is connected by means of an auxiliary contact $a_2$ of the auxiliary relay in parallel to the coil of the auxiliary relay when the auxiliary relay is in the excited state. The requisite switching hysteresis is achieved in this way and it is thus ensured that the auxiliary relay becomes excited and de-energised at the correct voltage levels. The main contact al of the auxiliary relay switches the zero voltage coil S or actuator in and out.

The series resistor R2 and the bridging resistor R3 have a resistance rating which preferably is lower than that of the actuating winding A of the auxiliary relay. In particular during de-energising, what is achieved in this way is that the de-energising voltage is determined mainly by the series resistor R2 and the bridging resistor R3. As a result the circuit is much more accurate and the hysteresis is much more precisely defined and the circuit is not greatly affected by temperature fluctuations.

What is claimed is:

1. Monitoring circuit for monitoring a voltage, comprising a coil (S), which is incorporated in a first current branch to be connected to the voltage to be monitored, and an auxiliary relay, an actuating winding (A) of which is incorporated in a second current branch connected in parrallel to the first current branch, characterised in that in the first current branch a first make contact ($a_1$) of the auxiliary relay is connected in series with the coil, in that in the second current branch a first resistor (R2) is connected in series with the actuating winding (A) of the auxiliary relay and in that a series circuit of a second resistor (R3) and a second make contact ($a_2$) of the auxiliary relay is connected in parallel to the actuating winding (A) of the auxiliary relay.

2. Monitoring circuit according to claim 1, characterised in that the resistance rating of the first and second resistor (R2, R3) is substantially lower than that of the actuating winding (A) of the auxiliary relay.

* * * * *